United States Patent
Huffer et al.

(10) Patent No.: US 6,546,872 B1
(45) Date of Patent: Apr. 15, 2003

(54) PROFILE PRINTING METHOD WITH ADDITIVE TECHNOLOGY

(75) Inventors: Scott W. Huffer, Hartsville, SC (US); Jeffrey M. Schuetz, Florence, SC (US)

(73) Assignee: Sonoco Development, Inc., Hartsville, SC (US)

( * ) Notice: Subject to any disclaimer, the term of this patent is extended or adjusted under 35 U.S.C. 154(b) by 0 days.

(21) Appl. No.: 09/724,992

(22) Filed: Nov. 27, 2000

(51) Int. Cl.[7] .......................... B32B 31/00; B41M 3/00
(52) U.S. Cl. ................ 101/491; 427/258; 427/261; 427/265; 428/195; 428/207; 101/483
(58) Field of Search ................ 101/211, 491, 101/483, DIG. 29; 427/256, 258, 261, 265, 287; 106/31.27, 31.6, 31.13; 428/195, 204, 207, 209

(56) References Cited

U.S. PATENT DOCUMENTS

| | | | |
|---|---|---|---|
| 1,509,664 A | 9/1924 | Brown | |
| 2,793,585 A | 5/1957 | Granitsas | 101/28 |
| 3,811,915 A * | 5/1974 | Burrell et al. | 428/143 |
| 3,859,110 A | 1/1975 | Foster et al. | 117/27 |
| 4,079,673 A | 3/1978 | Bernstein | 101/426 |
| 4,124,947 A | 11/1978 | Kuhl et al. | 40/453 |
| 4,184,700 A | 1/1980 | Greenaway | 283/6 |
| 4,759,982 A | 7/1988 | Jenssen et al. | 428/343 |
| 4,908,063 A | 3/1990 | Baker et al. | 106/31 |
| 5,008,144 A | 4/1991 | Baker et al. | 428/211 |
| 5,019,202 A * | 5/1991 | Kawahata et al. | 101/488 |
| 5,085,514 A | 2/1992 | Mallik et al. | 359/2 |
| 5,116,548 A | 5/1992 | Mallik et al. | 264/1.3 |
| 5,330,799 A | 7/1994 | Sandor et al. | 427/510 |
| 5,401,303 A | 3/1995 | Stoffel et al. | 106/20 R |
| 5,538,674 A | 7/1996 | Nisper et al. | 264/1.31 |
| 5,539,440 A | 7/1996 | Higuchi et al. | 347/112 |
| 5,554,432 A | 9/1996 | Sandor et al. | 428/157 |
| 5,665,457 A * | 9/1997 | Sato et al. | 156/275.5 |
| 5,742,432 A | 4/1998 | Bianco | 359/566 |
| 2002/0098292 A1 * | 7/2002 | Decre et al. | 427/421 |

FOREIGN PATENT DOCUMENTS

| | | |
|---|---|---|
| EP | 0 569 640 | 11/1993 |
| EP | 0 974 626 | 1/2000 |
| EP | 1 022 151 | 7/2000 |
| JP | 55-146785 | 11/1980 |
| WO | WO 00/37258 | 6/2000 |

* cited by examiner

Primary Examiner—Leslie J. Evanisko
(74) Attorney, Agent, or Firm—Drinker Biddle & Reath LLP

(57) ABSTRACT

A method of printing and the resulting printed product is disclosed which provides a three dimensional raised look and feel without requiring expensive embossing rollers. A surface tension lowering additive is added to ink or clear resin or varnish, and the ink is printed onto a substrate in a pattern of substantially parallel lines, leaving spaces of substrate exposed between the lines of ink or clear resin or varnish. The clear resin or varnish may also be printed on a clear film and ink is then printed on the resin or varnish. The film can then be laminated to a metallized film, foil or other reflective surface. A resin coating is applied over the printed pattern. The resin collects in the areas of exposed substrate due to the differential surface tension. The result is a pattern of raised resin profile ridges oriented along the pattern of ink lines.

15 Claims, 2 Drawing Sheets

PROFILE PRINTING METHOD WITH ADDITIVE TECHNOLOGY

FIELD OF THE INVENTION

The present invention relates to a method of printing and printed products. More specifically, the present invention relates to a method of printing profile ridges by applying resin to a low surface tension ink.

BACKGROUND OF THE APPLICATION

In today's marketplace, products are often distinguished as much by the packaging in which they are presented as the quality of the product itself. A package which catches the eye of the consumer is therefore very desirable. To that end, increasingly colorful and creative graphics have been applied to packaging in an attempt to distinguish one package, and hence one product, from another.

One popular graphic with visual appeal for consumers is the hologram. Holograms present a three dimensional image to the consumer. Unfortunately, holograms are expensive to produce, requiring high precision embossing equipment and tools. The capital expense required to produce holograms is high enough that holograms are often used as a security device.

Simpler embossing methods can be used at lower cost than holograms to produce a graphic with a textured or raised look and feel. Embossing can produce interesting visual effects when a clear profile is embossed over an image. The underlying image appears differently from various viewing angles due to refraction of light through the embossed profile. However, even simple embossing equipment requires a significant capital expenditure.

Thus, there is a need for a simpler, less expensive technology for printing packaging material with a visually appealing, textured look and feel. The present invention provides such a printing method, eliminating the need for embossing rollers, while providing a profile pattern of raised ridges over printed matter.

SUMMARY OF THE INVENTION

The present invention provides a printing process and a printed product in which ink is combined with an additive that lowers the surface tension of the dried ink film. The enhanced ink is printed onto a substrate in a pattern of substantially parallel lines and allowed to dry. A clear resin or varnish is applied over or under the dried ink, and because of the difference in surface tension between the ink film and the substrate, the resin flows away from the ink film. The resin cures in a series of raised ridges oriented along the printed profile lines.

For reverse printed applications, the additive is formulated into the clear resin or varnish. The clear resin pattern is printed on a clear web. The clear pattern is dried and the ink is printed on top of the dried clear resin. This ink flows away from the clear resin due to the difference in surface tension, forming patterns of raised ink. This reverse-printed film is then laminated to a second film to complete the overall structure.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

DETAILED DESCRIPTION OF THE DRAWINGS

Figure 1:
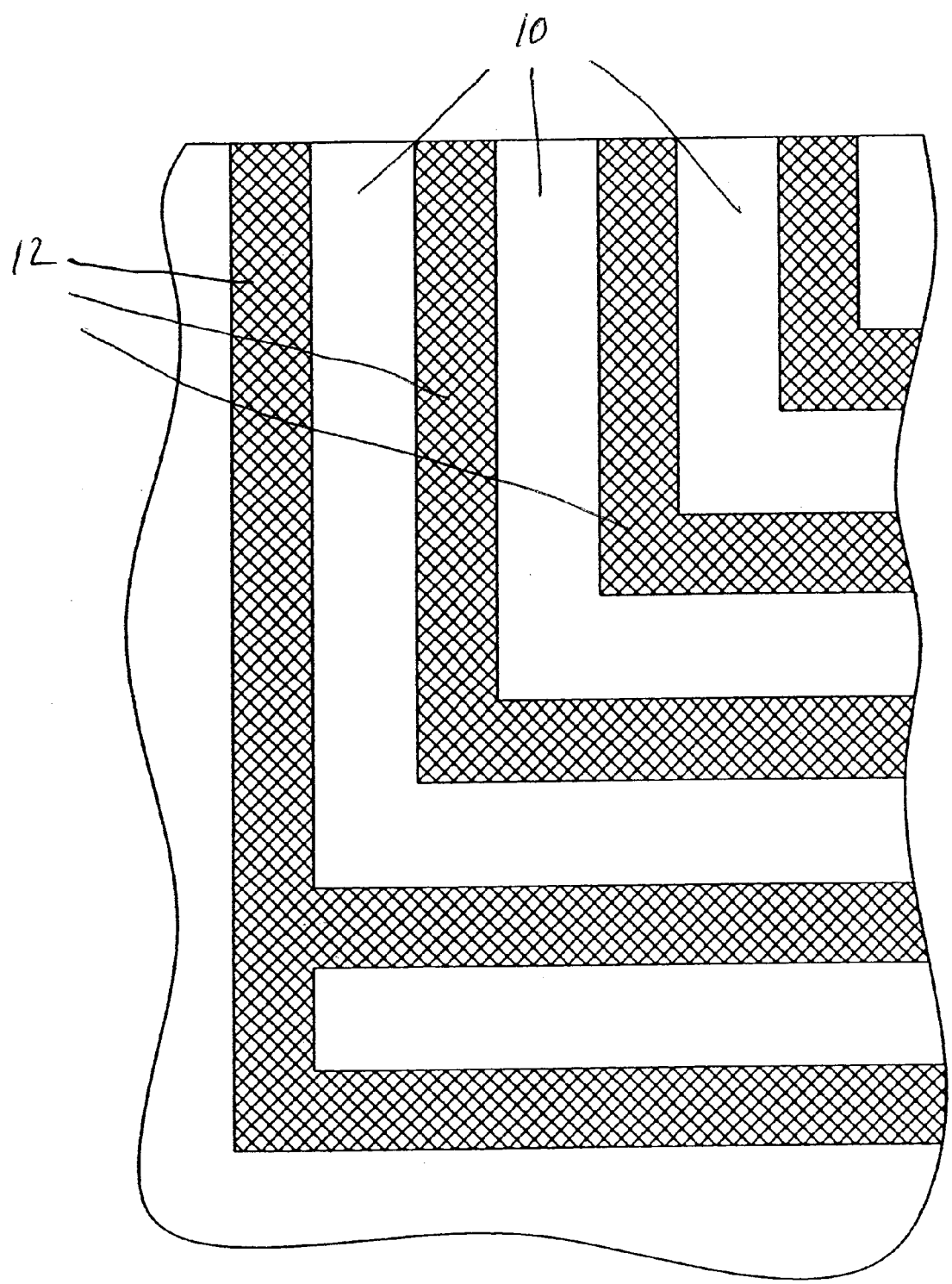
FIG. 1 is a top view of a portion of printed matter according to the present invention.
Figure 2:
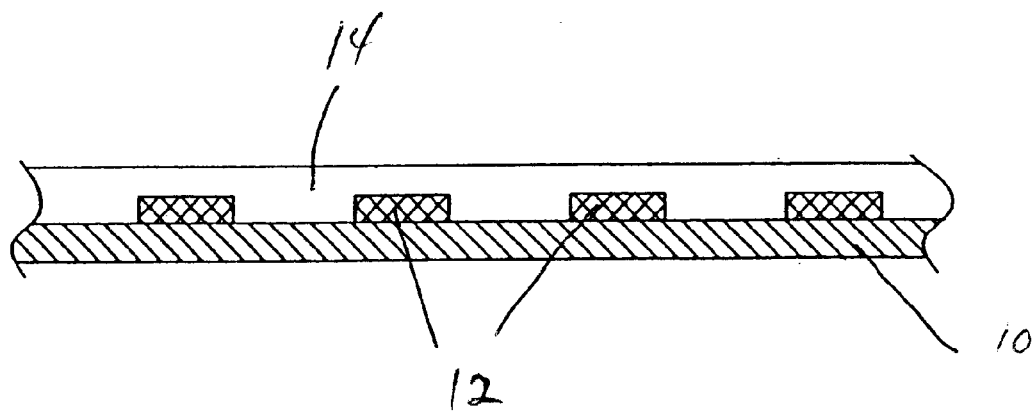
FIG. 2 is a cross section showing clear resin applied to a substrate and ink lines according to the present invention before any flow has occurred in the resin due to different surface tensions.
Figure 3:
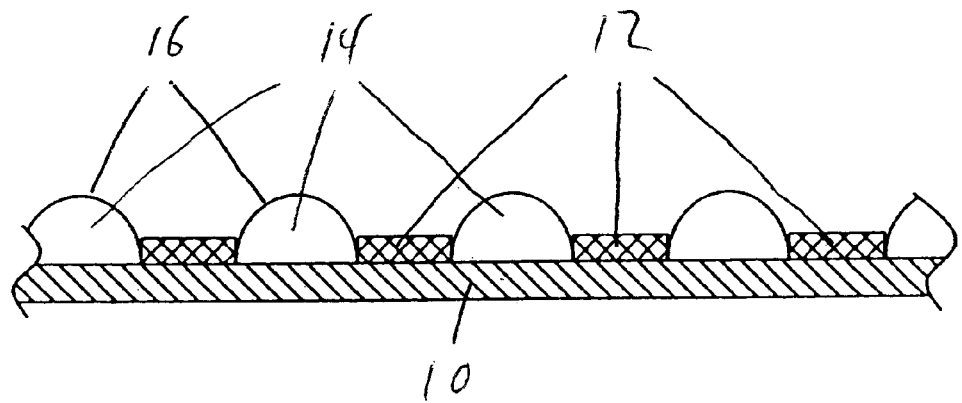
FIG. 3 is a cross section of printed matter according to the present invention.

In order to more clearly illustrate the invention, FIGS. 1–3 show a section of printed matter according to the present invention. Before printing, the ink is combined with an additive which lowers the surface tension of the dried ink film. One such additive is a hydroxy-modified polyether silane manufactured and sold by BYK-Chemie. The additive enhanced ink 12 is printed over the substrate 10 in a pattern of substantially parallel profile lines, leaving spaces between adjacent lines of ink so that the substrate remains exposed. The substrate is preferably a non-printed metallized film, foil, or other reflective surface.

FIG. 1 shows a section of substrate 10 which has been overprinted with ink 12 in a profile pattern. The particular printing method used to apply the ink to the substrate is not important, and those of ordinary skill in the art will recognize that a variety of printing methods are available. One example of a suitable printing method is the rotogravure process. Rotogravure is preferable because it produces highly accurate images, while allowing for high press and production speeds. Rotogravure cylinders engraved by a laser engraver will yield both the production volume and continuous channels necessary to produce the desired visual effect.

The laser engraver is capable of engraving deep continuous channel for the ink. Mechanical engraving with a diamond stylus will only produce large cells with narrow channels of a much smaller volume.

A resin 14 is applied over the printed ink pattern area 12. The resin is preferably clear when dried. FIG. 2 shows a cross section of some printed matter immediately after the resin 14 has been applied. The resin 14 is in contact with both the printed dried ink film 12 and the substrate 10 between lines of ink 12. Because the surface tension of the dried ink film 12 is lower than the surface tension of the substrate 10, the resin 14 flows away from the dried ink film 12 and toward the areas of exposed substrate 10.

FIG. 3 shows a cross section of printed matter according to the invention after the resin 14 has completed its flow. The resin 14 has collected in the areas of exposed substrate 10 between the profile lines of ink 12. Thus, the resin 14 forms raised ridges 16 that are oriented along the patterned lines of ink 12. Because the resin is clear or translucent, refraction of light through the resin will cause the printed matter to change appearance when viewed from different angles. The resin 14 is allowed to set to form lasting raised profile ridges 16 oriented along the lines of the ink pattern 12.

Without the additive in the ink the resin would normally flow out to a continuous film and would not yield a refraction pattern as contemplated by the raised ridges in the present invention. Other visual effects can be created by the use of various colored or metallic inks that may be substituted for the clear profile resin. For reverse printed applications, the clear resin is pattern applied with the additive first and then the ink is printed to form the patterns.

It should be understood that when producing the printed structure on press, independent registration control is possible for the individual profile stations, resulting in better overall registration. Further, by the use of a laser engraver, highly accurate patterns can be created. Also, more volume of the resin or coating can be deposited on the surface due to the large volume of cells produced on the laser engraver. This large volume is possible with the present invention substantially without the occurrence of "flow outs".

It is contemplated that further variations of the present invention are possible by the use of four color printing techniques and by the addition of scuff resistant coatings or the like. Scuff resistance may also be achieved by reverse printing the ink and resin coating on a clear film and applying the film to a second substrate.

The present invention may be embodied in still further specific forms without departing from the spirit or essential attributes thereof and, accordingly, reference should be made to the appended claims, rather than to the foregoing specification, as indicating the scope of the invention.

What is claimed is:

1. A printing process comprising the steps of:
   providing a printing ink;
   providing a coating;
   adding a surface tension lowering additive to the coating;
   printing the coating onto a substrate in a pattern of substantially parallel lines such that non-printed areas remain between the substantially parallel lines of printed coating;
   drying the coating;
   applying the ink over the substrate and the coating, allowing the ink to flow from the coating printed areas to the non-printed areas until the ink forms raised ridges oriented along the lines of the coating pattern, and
   drying the ink.

2. A printing process as claimed in claim 1 wherein the substrate is a metallized film.

3. A printing process as claimed in claim 1 wherein the additive is hydroxy-modified polyether silane.

4. The printing process of claim 1 wherein the coating is a resin.

5. The printing process of claim 4 wherein the resin coating is clear.

6. The printing process of claim 1 wherein the coating is a varnish.

7. The printing process of claim 1 wherein the ink is a pattern of colored inks.

8. The printing process of claim 1 wherein the ink is a pattern of metallic ink.

9. The printing process of claim 8 wherein the reflective surface is a foil.

10. The printing process of claim 1 wherein the substrate is a reflective surface.

11. The printing process of claim 1 wherein the substrate is a clear film.

12. The printing process of claim 11 further comprising the step of securing the printed film to a second substrate, with the ink and coating positioned between the first and second substrates.

13. The printing process of claim 1, wherein the coating is printed using laser engraved rotogravure.

14. The printing process of claim 13, wherein the ink is applied using laser engraved rotogravure.

15. The printing process of claim 1, wherein the ink is applied using laser engraved rotogravure.

* * * * *